United States Patent [19]
Chaitin et al.

[11] Patent Number: 4,656,582
[45] Date of Patent: Apr. 7, 1987

[54] GENERATING STORAGE REFERENCE INSTRUCTIONS IN AN OPTIMIZING COMPILER

[75] Inventors: Gregory J. Chaitin, Yorktown Heights; Martin E. Hopkins, Chappaqua; Peter W. Markstein, Yorktown Heights; Henry S. Warren, Jr., Ossining, all of N.Y.

[73] Assignee: International Business Machines Corporation, Armonk, N.Y.

[21] Appl. No.: 697,675

[22] Filed: Feb. 4, 1985

[51] Int. Cl.$^4$ .............................................. G06F 1/00
[52] U.S. Cl. .................................................... 364/300
[58] Field of Search ........................................ 364/300

[56] References Cited
U.S. PATENT DOCUMENTS 4,435,753  3/1984  Rizzi ................................ 364/300 X
4,567,574  1/1986  Saadé et al. ..................... 364/300 X Primary Examiner—Raulfe B. Zache
Attorney, Agent, or Firm—Roy R. Schlemmer

[57] ABSTRACT

A method for improving the quality of code generated by a compiler in terms of execution time, object code space, or both. The method is applicable to computers that have a redundancy of instructions, in that the same operation exists in forms that operate between registers, between main storage locations, and between registers and main storage. The method selects the best form of each such instruction to use, for the context in which the instruction lies.

7 Claims, 2 Drawing Figures

GENERATING STORAGE REFERENCE INSTRUCTIONS IN AN OPTIMIZING COMPILER

FIELD OF THE INVENTION

This invention has particular utility in a compiler for a digital computer in which optimization algorithms are used to improve the quality of the code.

The invention is applicable to computers that use a set of general registers, and that have a redundancy of instructions, in that the same operation exists in forms that operate between registers, between main storage locations, and between registers and main storage. The IBM System/370 and the Motorola MC68000 are examples of such machines. For the present invention to be applicable, a register operand must be preferable to a main storage operand, and a main storage operand must be preferable to an explicit load from storage, followed by that operation done with a register operand. For example, an "add" on the IBM System/370 can be done in any of the three ways shown below.

(1)
Ar r1,r2
(2)
A r1,d(r2)
(3)
L r3,d(r2)
AR r1,r3

The first uses the "add register" instruction (AR). It adds the contents of general register r2 to the contents of general register r1, and places the result in r1. To use this instruction, the two quantities to be added must already reside in general registers. The second method adds from storage. Here "d" denotes a "displacement," which is simply a numerical constant. Register r2 is used as a "base," and the sum of "d" and the contents of r2 is used to address storage. The addressed word is added to the contents of r1. The third method explicitly loads one of the quantities to be added from storage addressed by "d(r2)" into a general register (r3), and then adds r3 to r1. On the System/370, the first method is the best, the second is intermediate, and the third is the least desirable way to do the add. However, if the quantity loaded into r3 is used in other places in the program, the third method may give the most efficient overall program. For the present invention to be applicable, this hierarchy of preferences must exist. The preference may be either in object code space or in execution time. On the System/370 and MC68000, register operands are preferable to storage operands in both space and time.

BACKGROUND OF THE INVENTION

The quality of code produced by compilers has been an issue ever since the first compiler was produced. One of the principal objectives of IBM's FORTRAN I compiler, the first commercially available compiler, was to produce object code in the field of scientific computations which was comparable in code quality to that produced directly by assembly language programmers coding "by hand."

Today, higher level languages are designed to be used in every field in which computers are applicable. Even the original FORTRAN language has been bolstered to make it applicable to a wide range of programming tasks. However, it is still important that the quality of code produced by the compiler be high, especially if the resultant code is to be used in a production environment. Code produced by a skilled assembly language programmer is still the yardstick against which compiler produced code is measured.

A large number of optimization techniques have been developed and refined since the 1950's to improve the quality of compiler generated code. Indeed, many of these optimizations were known in principle, and used in some fashion by the team that produced the first FORTRAN compiler.

Optimizations that are frequently employed in optimizing compilers can be divided into two classes, which are commonly known as "global" and "peephole" optimizations. Global optimizations are those that are based on an analysis of the entire program being compiled. Examples are "code motion" (moving code out of loops) and "common subexpression elimination." Peephole optimizations are those that are based on an analysis of a relatively small region of the program, such as a "basic block," or perhaps only two adjacent instructions.

The present invention can be implemented as a global optimization or as a basic block optimization. It is described here as a global optimization, in which form it is most effective. The only information it needs from global analysis is that of live/dead information, in the form of a "last use" or "not last use" indication associated with each register operand of each instruction. This information tells, for each register operand of an instruction, whether or not that register can be used again before it is reloaded with a new quantity.

The following references discuss live variable analysis:

J. D. Ullman, "A Survey of Data Flow Analysis Techniques," Second USA-Japan Computer Conference Proceedings, AFIPS Press, Montvale, N.J., pp 335-342 (1975), (contains 37 references).

A. V. Aho and J. D. Ullman, "Principles of Compiler Design," Addison-Wesley, (1977).

M. S. Hecht, "Flow Analysis of Computer Programs," Elsevier North-Holland, New York, (1977).

DESCRIPTION OF THE PRIOR ART

A number of computer data bases were searched for prior art. No art relevant to this particular invention was found.

SUMMARY AND OBJECTS OF THE INVENTION

It is a primary object of the present invention to provide an optimizing compiler with a module that decides which operands should be referenced from the register space of the computer, and which should be referenced from main storage. The choice is made only on the basis of the instruction set available to the computer, and the pattern of operand uses in the program; it does not take into account the number of registers available.

It is a further object of the invention to assure that "load" and "store" instructions are present in the program at appropriate points for those operands that are best held in registers.

It is a further object of the invention to provide an optimizing compiler with a module that selects the optimum form of machine instruction for each operation, where the form corresponds to which operands are referenced in a register and which are referenced from main storage.

It is a further object of the invention to simplify the global optimizer, by allowing it to ignore the existence of instructions that reference main storage, other than "load" and "store."

It is a further object of the invention to make global optimization more effective, by allowing it to move storage references out of loops, and common them, even when the instructions that use the referenced quantity must remain in a loop, or cannot be commoned.

It is a further object of the invention to reduce "register pressure" by leaving an operand in main storage when it is used in only one place. This permits the register allocator to generate better machine code.

It is a further object of the invention to utilize the results of global "liveness analysis" of a program, an analysis which is done by most globally optimizing compilers.

The objects of the present invention are accomplished in general by a method operable in an optimizing compiler for generating code for subsequent machine execution which is more efficient in terms of storage references. The method comprises first generating intermediate code that completely avoids the SR, RS and SS instructions for arithmetic-like data the code referring to main memory only via "load" and "store" instructions, and wherein all computations are done in registers (register ops) using symbolic RR instructions. Next the program is optimized by standard techniques including commoning, code motion out of loops, strength reduction, dead code elimination, etc. Predetermined patterns are then located in the code, comprising a 'load' op followed by a 'register' op or a 'store' op referring to the same objects and replacing these patterns with SR, RS or SS instructions if the predetermined patterns exist.

Real registers are then assigned to each instruction by replacing each symbolic register with a real machine register, and generating "spill" code where necessary. This is done by any conventional register assignment module.

The predetermined patterns are again searched for in the code produced by the register assignment step and these patterns are replaced with SR, RS or SS instructions when the predetermined patterns are located and, finally machine code is generated from the intermediate code produced by the previous step.

DISCLOSURE OF THE INVENTION

Figure 1:
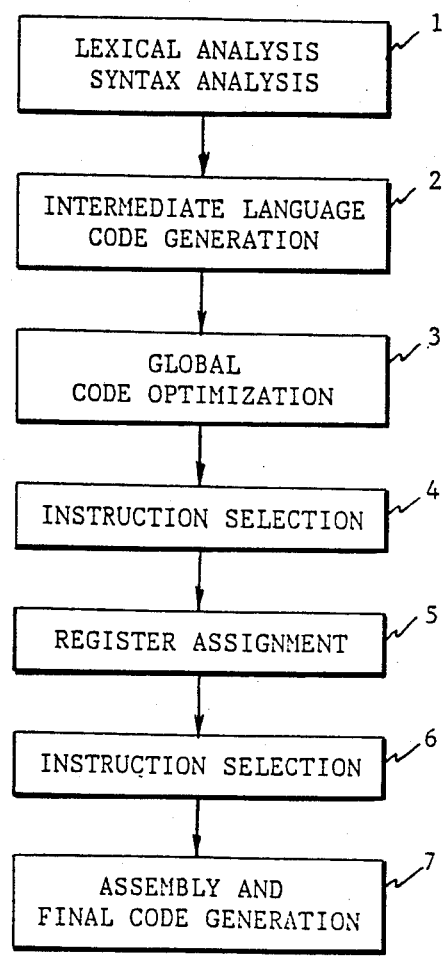
FIG. 1 is a very high level functional flowchart of an optimizing compiler in which the present invention has particular utility.

It is assumed for the present description of the invention that the instruction format is two-address, and the following abbreviations will be used for the relevant classes of instructions:
RR: register-to-register
SR: storage-to-register (denoted RX on the System/370)
RS: register-to-storage
SS: storage-to-storage.

Details of the instructions for two representative machines can be found in the following references:

"IBM System/370 Extended Architecture Principles of Operation," IBM Form SA22-7085, IBM Corporation, (1983).

"MC68000 16-bit Microprocessor User's Manual," Second edition, Motorola, Inc., (January 1980).

As an example of the code improvement accomplished by this invention, suppose the source program being compiled contains the assignment statement:

A=A+B where A and B are arithmetical variables (e.g., integer or floating point on the System/370). Suppose further that at the start of execution of that statement, the quantities A and B have not been loaded into registers. We consider a hypothetical machine that has four "add" instructions:

A_RR Adds the contents of one register to another,
A_SR Adds the contents of a storage location to a register,
A_RS Adds the contents of a register to storage, and
A_SS Adds the contents of a storage location to another, where the instructions are listed in order of decreasing preference of use. Then the best code which can be generated for the assignment statement depends upon whether or not A and B are used after the assignment statement. There are four cases:
(1) A and B both 'live' after the assignment statement,
(2) A is 'live,' B is 'dead,'
(3) A is 'dead,' B is 'live,' and
(4) A and B are both 'dead.'

Application of the present invention will give the following machine code sequences for these four cases:

```
(1)
L        r1,A
L        r2,B
A_RR r1,r2
(2)
L        r1,A
A_SR r1,B
(3)
L        r1,B
A_RS r1,A
(4)
A_SS A,B
```

The requirement for an "add" may have arisen in other ways than simply from an assignment statement, for example in addressing arithmetic (e.g., addressing an array element). Furthermore, the invention applies when there are many instructions between the "add" and the other uses of its operands, and when the operands may have been previously loaded into registers.

As stated previously, the invention is described as it fits into an optimizing compiler, particularly adaptable to the IBM System/370 and MC68000 target machines. The assembly language used will be similar to that commonly used for the IBM System/370. In particular, the instructions are two-address and the first operand is the target for all instruction types except "store" and the RS-format instructions, for which the second operand is the target.

The difficulty with the SR, RS and SS instructions is that if the compiler generates them early, they generally stay in the program, i.e., they exist in the final object code, and a program that heavily uses these instructions is often not very efficient. On the other hand one does not want to avoid their use entirely, because their use sometimes improves efficiency.

The reason they tend to stay in the program if they are generated early is that they reference main storage, and main storage references are much more difficult for a compiler to analyze than are register references. This is because there are many ways to reference the same memory location, but only one way to reference a general register.

FIG. 1 shows how the present invention fits into a globally optimizing compiler. The invention is shown as a module called "Instruction Selection" which is invoked two times during the compilation process (Blocks 4 and 6): before and after "register allocation." With references to FIG. 1, the method is:

1. First, generate intermediate code that completely avoids the SR, RS and SS instructions for arithmetic-like data (bytes, halfwords, and fullwords). (FIG. 1 Blocks 1 and 2.) The code at this point refers to main memory only via "load" and "store" instructions, and all computations are done in registers using RR instructions. (At this stage, we assume there is an arbitrarily large number of registers available.)

2. Second, optimize the program by the standard techniques: commoning, code motion out of loops, strength reduction, dead code elimination, etc. (Block 3).

3. Look for certain patterns in the code, described below, and replace these patterns with SR, RR, or SS instructions if they exist (Block 4).

4. Next assign registers (Block 5). That is, associate each symbolic register with a machine register, and generate "spill" code where necessary. The "spill" code consists of "store" and "load" instructions that are required whenever the number of quantities desired to be in a register exceeds the number of machine registers available.

5. Repeat step (3), only this time operating on the intermediate code with real registers assigned (Block 6).

6. Finally, generate machine code (Block 7).

There are three reasons for doing global optimization (Block 3) before instruction selection. One is that global optimization produces the "last use" bit for each register operand, and this is needed by code selection. The second reason is that when global optimization is done, there are no SR, RS nor SS instructions present in the intermediate language code. This simplifies the optimizer, as it has fewer instruction types to deal with. The third reason is that optimization is more effective when the instructions are more elementary, because the more elementary operations can be commoned and moved out of loops, whereas a combination of elementary operations into one instruction may not be able to be commoned or moved out of a loop. An example of this is given below.

For best results, instruction selection is done both before and after register assignment (Block 5). The reason for doing it before register assignment is that instruction selection often frees a register. For example, when it changes (1) below to (2),

```
(1)
L     r1,A
L     r2,B
A_RR  r1,r2
(2)
L     r1,A
A_SR  r1,B
``` register r2 is freed. This permits register assignment to generate better code (fewer spill instructions). The reason for repeating code selection after registers have been assigned is that register assignment will sometimes generate "spill" code such as

```
L     r1,SPILL1
L     r2,SPILL2
A_RR  r1,r2
``` and this can profitably be changed to use an A_SR instruction. However, experience has shown that a second pass of code selection gives a smaller gain than the first pass, so the second pass could be made an optional pass that is only done when the highest degree of optimization is requested.

Figure 2:
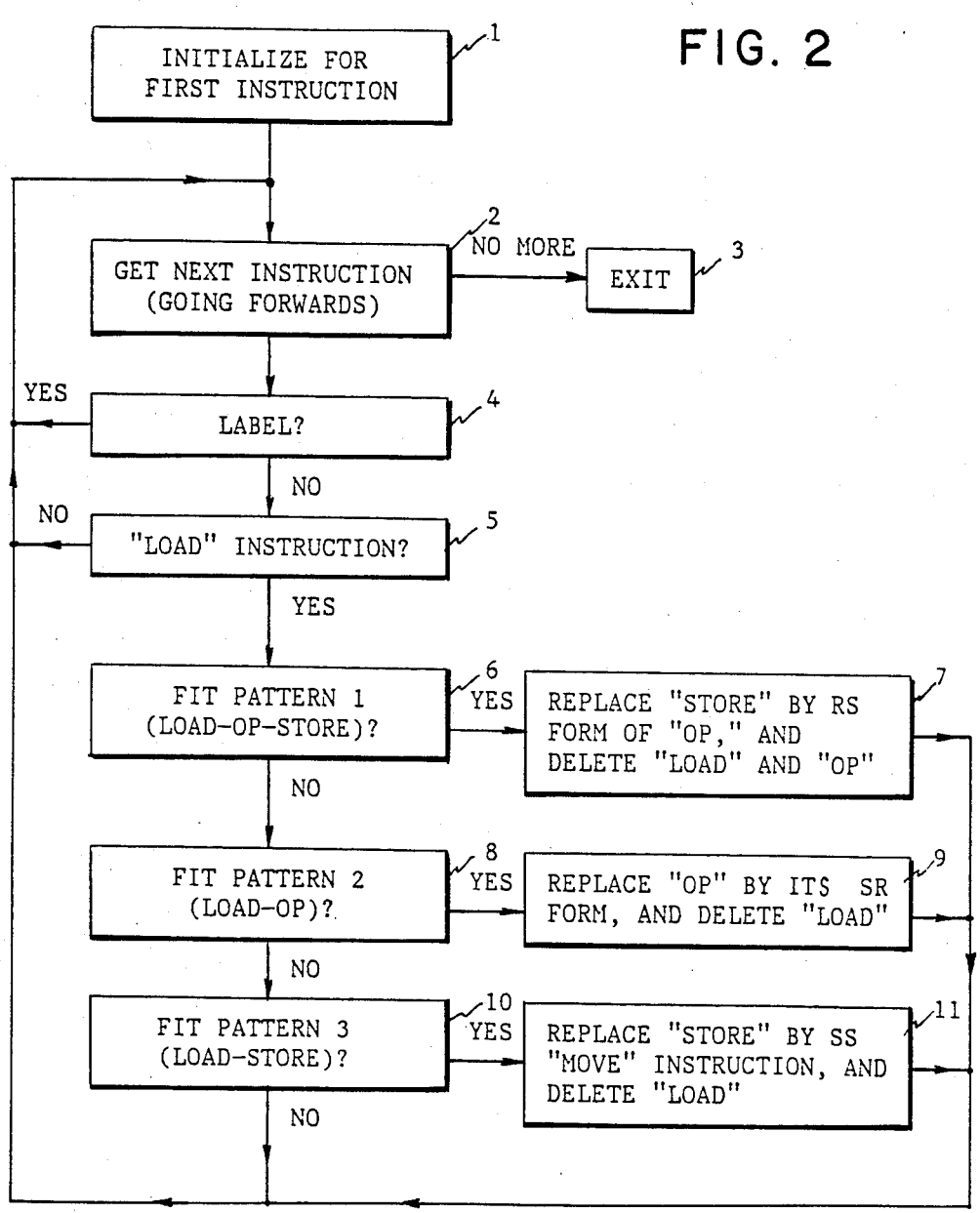
FIG. 2 is a high level flowchart of the herein disclosed compiler module for effecting the desired instruction selection.

Although the details of code selection are not the main subject of this invention, how it might be done will now be described for the purpose of illustration. Refer to FIG. 2.

Scan the code from label-to-label (between program join points), looking for the following pattern, referred to as "pattern 1" in FIG. 2 Block 6:

```
load r1,d(ri,rb)
...
op r1,r2
...
store r1,d(ri,rb)
```

Here "load" denotes a load-type instruction; it could be load-fullword or load-halfword, etc. The notation "d(ri,rb)" signifies a reference to main storage using a displacement "d," an index register "ri," and a base register "rb." The second occurrence of "d(ri,rb)" must have the same values for "d," "ri," and "rb" as the first, so that the load and store instructions reference the same main memory locations.

If there are:
(a) no stores nor subroutine calls between the "load" and "store,"
(b) no sets of ri nor rb between the "load" and "store,"
(c) no use of r1 between the "load" and "store," including ri and rb in the "store" itself,
(d) no sets of r2 between the "op" and "store,"
(e) r1 is last used at the "store," and
(f) "op" has an equivalent RS format instruction "op_rs,"
then replace the "store" by:

```
op_rs r2,d(ri,rb)
``` and delete the "load" and "op" instructions (or let them be deleted by a subsequent pass of dead code elimination, if there is to be such a pass).

While scanning the code looking for pattern 1 described above, look also for the following, which is denoted "pattern 2" in FIG. 2 Block 8 (if both pattern 1 and pattern 2 occur, use the transformation of pattern 1 above):

```
load r1,d(ri,rb)
...
op r2,r1
```

If there are:
(a) no stores nor subroutine calls between the "load" and "op,"
(b) no sets of ri nor rb between the "load" and "op,"
(c) no use of r1 between the "load" and "op,"
(d) r1 is last used at "op," and
(e) "op" has an equivalent SR format instruction "op_sr,"
then replace the "op" by:

```
op_sr r2,d(ri,rb)
``` and delete the "load" instruction (or let it be deleted by a subsequent pass of dead code elimination).

While scanning the code looking for patterns 1 and 2, look also for the following, which is denoted "pattern 3" in FIG. 2 Block 10:

```
load r1,d1(ri1,rb1)
...
store r1,d2(ri2,rb2)
```

The "load" and "store" may address different storage locations. If there are:
(a) no stores nor subroutine calls between the "load" and "store,"
(b) no sets of ri1 nor rb1 between the "load" and "store,"
(c) no use of r1 between the "load" and "store,"
(d) r1 is last used at the "store," and
(e) the load/store pair has an equivalent storage-to-storage move instruction that is preferable to the load/store pair,
then replace the "store" by:

```
move d2(ri2,rb2),d1(ri1,rb1)
``` and delete the "load" instruction (or let it be deleted by a subsequent pass of dead code elimination).

These pattern searches are sufficient to detect profitable places to use the SR, RS and SS instructions that exist on the System/370 and MC68000 computers. If a computer has similar but more complex instructions, such as a three-address storage-to-storage "add," then similar pattern searches could be employed.

In the above searches, it is important to know if a certain use of a register is a "last use." This could be determined "on the fly" by a forward search of the program, but it is preferable in terms of compilation time to have the global optimizer (FIG. 1 Block 3) set a "last use" bit that is associated with each operand.

As an example of the use of these patterns, suppose the source program has the statement

X=X−Y

Then the compiler would initially generate the straightforward code:

```
load  r1,X(rb)
load  r2,Y(rb)
sub   r1,r2
store r1,X(rb)
```

Assuming there are no other uses of r1, the first, third, and fourth instructions fit the first pattern. Hence the code will be replaced by:

```
load    r2,Y(rb)
sub_rs  r2,X(rb)
```

Now assume the same sequence of four instructions exists, but there are other uses of r1 after the "store" instruction. Then the first pattern will not fit, but the second one will, giving the code:

```
load    r1,X(rb)
sub_sr  r1,Y(rb)
store   r1,X(rb)
```

If the same sequence of four instructions exists, but there are subsequent uses of both r1 and r2, then both of the first two patterns will fail to fit, and the code will be left in its original "load, load, sub, store" form. But this is probably the best thing to do, because the quantities are left in r1 and r2 for their subsequent uses, i.e., they don't have to be reloaded from memory.

As another example, suppose the source program has the statement:

X(I)=Y in a loop in which I varies. We wish to consider two cases: (1) Y is altered in the loop, and (2) Y is not altered in the loop. In either case, the code initially generated is:

```
load  r1,Y(rb1)
store r1,X(rb2,ri)
```

Next the optimizer will, by the process of "code motion," move the "load" out of the loop, in the case where Y is loop-invariant. It will leave the code unchanged in the case that Y varies in the loop. We then have the following two cases:

```
(1)
loop: ...
      load  r1,Y(rb1)
      store r1,X(rb2,ri)
(2)
      load  r1,Y(rb1)
loop: ...
      store r1,X(rb2,ri)
```

Next the pattern searches are done. The first case fits pattern 3, and the second case does not. The final code is:

```
(1)
loop: ...
      move X(rb2,ri),Y(rb1)
(2)
      load  r1,Y(rb1)
loop: ...
      store r1,X(rb2,ri)
```

This is the best code in both cases, in terms of execution time, assuming that "store" is a faster-executing instruction than "move."

This illustrates one situation in which global optimization is most effective when it deals with elementary instructions (load, store), rather than more complex instructions (move), because sometimes one of the elementary instructions can be moved out of a loop, whereas a combination of the elementary instruction with another cannot be moved out of the loop.

In summary, this invention causes SR, RS and SS instructions to be generated approximately when and only when they are useful.

Other instructions, similar to the above, may be generated in appropriate situations by this invention. Examples are the System/370 TM (test under mask) and the MC68000 "immediate" instructions. That is, for immediate operations on the MC68000, it is often best to load the immediate quantity into a register and reference it from there if there are two of more uses of the immediate quantity, or if the use is in a loop. But it is best to compile the immediate quantity into the instruction that uses it, if there is only one use.

The method described above could be incorporated into any compiler by a programmer who is skilled in compiler construction. It has been incorporated into a compiler that translates a language called PL.8, which is similar to the well-known PL/I, to the IBM System/370 and the Motorola MC68000 machine languages. It has resulted in substantially improved compiler performance.

Having thus described our invention, what we claim is new, and desire to secure by Letters Patent:

1. A method for use in an optimizing compiler for generating code for subsequent machine execution which is more efficient in terms of storage references, said method comprising, first generating intermediate code that completely avoids the SR, RS and SS instructions for arithmetic-like data, said code referring to main memory only via "load" and "store" instructions, and wherein all computations are done in registers (register ops) using symbolic RR instructions, optimizing the program by standard techniques including commoning, code motion out of loops, strength reduction, dead code elimination, and locating predetermined patterns in the code, comprising a 'load' op followed by a 'register' op or a 'store' op referring to the same object(s) and replacing these patterns with a shorter instruction sequence of SR, RS or SS instructions if said predetermined patterns exist.

2. A method for use during the instruction selection phase of an optimizing compiler after the intermediate language generation phase in which all arithmetic operations are defined in terms of symbolic register ops and in which all memory operations are defined in terms of load and store ops and combined with necessary register ops, said method comprising; sequentially accessing the intermediate code instructions and processing the same as follows:

determining if an instruction is a label, if so obtaining the next instruction, if not, determining if it is a load instruction, if not, obtaining the next instruction, if so, determining first if it and the following instructions corresponds to a first pattern of a load operation followed by a register operation followed by a store operation all involving the same objects, if so, replacing the store operation by the RS form of the operation and deleting the load operation and the register operation and accessing the next instruction, if the operation sequence did not follow the pattern, determining second if the following instructions correspond to a second pattern of a load operation followed by a register operation, if so, replacing the register operation by its SR form and deleting the load operation, and if the operation sequence did not follow this pattern, determining third if the following instructions correspond to a third pattern of a load operation followed by a store operation, if so, replacing the store instruction by an SS move instruction and deleting the load instruction and obtaining the next instruction, if none of the three patterns specified are present, obtaining the next instruction in the sequence.

3. A method as set forth in claim 2 wherein an additional test is made for all three patterns whereby the replacement procedure is modified to retain any operand or result in a register if it is determined that it will be used again in the instruction sequence.

4. A method as set forth in claim 2 wherein, before the specified program alterations are made responsive to a successful search for the first pattern, including the further step of, determining if the following criteria are met:
(a) no stores nor subroutine calls between the load operation and store operation,
(b) no sets of corresponding 'index' or 'base' registers between the load operation and store operation,
(c) no use of r1 between the load operation and store operation, including index and base registers in the store operation itself,
(d) no sets of r2 between the register operation and store operation,
(e) r1 is last used at the store operation, and
(f) register operation has an equivalent RS format instruction "op—rs,"
(where r1 and r2 are register operands) and,
proceeding to the next step in the sequence if not all of the above criteria are met.

5. A method as set forth in claim 2 wherein, before the specified program alterations are made responsive to a successful search for the second pattern, including the further step of, determining if the following criteria are met:
(a) no stores nor subroutine calls between the load operation and register operation,
(b) no sets of corresponding 'index' or 'base' registers between the load operation and register operation,
(c) no use of r1 between the load operation and register operation,
(d) r1 is last used at the register operation, and
(e) the register operation has an equivalent SR format instruction "op—sr,"
(where r1 is a register operand) and,
proceeding to the next step in the sequence if not all of the above criteria are met.

6. A method as set forth in claim 2 wherein, before the specified program alterations are made responsive to a successful search for the third pattern, including the further step of, determining if the following criteria are met:
(a) no stores nor subroutine calls between the load operation and store operation,
(b) no sets of corresponding 'index' or 'base' registers between the load operation and store operation, (c) no use of r1 between the load operation and store operation, (d) r1 is last used at the store operation, and (e) the load/store pair has an equivalent storage-to-storage move instruction that is preferable to the load/store pair, (where r1 is a register operand) and, obtaining the next instruction in the sequence if not all of the above criteria are met.

7. A method for use in an optimizing compiler for generating code for subsequent machine execution which is more efficient in terms of storage references, said method comprising, first generating intermediate code that completely avoids the SR, RS and SS instructions for arithmetic-like data, said code referring to main memory only via "load" and "store" instructions, and wherein all computations are done in registers (register ops) using symbolic RR instructions, optimizing the program by standard techniques including commoning, code motion out of loops, strength reduction, dead code elimination, locating predetermined patterns in the code, comprising a 'load' op followed by a 'register' op or a 'store' op referring to the same object and replacing these patterns with a different pattern of SR, RS or SS instructions if said predetermined patterns exist, assigning real registers to each instruction by replacing each symbolic register with a real machine register, and generating "spill" code where necessary and again, locating said predetermined patterns in the code produced by the previous step and replacing these patterns with a different pattern of SR, RS or SS instructions if said predetermined patterns exist and, generating machine code from the intermediate code produced by said previous step.

* * * * *